United States Patent [19]

Kato

[11] Patent Number: 4,690,594
[45] Date of Patent: Sep. 1, 1987

[54] DEBURRING APPARATUS

[75] Inventor: Minoru Kato, Kawasaki, Japan

[73] Assignee: Myotoku Ltd., Tokyo, Japan

[21] Appl. No.: 741,603

[22] Filed: Jun. 5, 1985

[30] Foreign Application Priority Data

Jun. 16, 1984 [JP] Japan .............................. 59-89745[U]

[51] Int. Cl.$^4$ .............................................. B23B 27/02
[52] U.S. Cl. .................................... 408/159; 408/178; 408/187; 82/1.5
[58] Field of Search ............... 408/153, 154, 156, 158, 408/159, 103, 104, 105, 106, 107, 108, 109, 81, 187, 21, 173, 174, 175, 176, 177, 178, 74, 93, 100, 112, 155, 180, 72; 82/1.5, 1.2, 11

[56] References Cited

U.S. PATENT DOCUMENTS

| | | | |
|---|---|---|---|
| 592,979 | 11/1897 | Bartlett | 82/1.5 |
| 2,620,689 | 12/1952 | Cogsdill | 408/187 |
| 2,778,251 | 1/1957 | Gunas | 408/104 |
| 3,008,360 | 11/1961 | Winberry, Jr. | 408/159 |

FOREIGN PATENT DOCUMENTS 931024 7/1955 Fed. Rep. of Germany ...... 408/159

Primary Examiner—Z. R. Bilinsky
Assistant Examiner—A. Dougas
Attorney, Agent, or Firm—Robert E. Burns; Emmanuel J. Lobato

[57] ABSTRACT

Deburring apparatus for removing the burrs which are formed at the intersecting inner edges of at least two intersecting bores of a workpiece comprises; a frame having means for holding the workpiece; a cutter spindle borne rotatably in the frame; a cutter hinged to the leading end portion of the cutter spindle and biased to swing outwardly of the side thereof for cutting off the burrs at the inner edges of the bores of the workpiece held by the holding means of the frame when the cutter spindle is inserted into one of the bores and rotated; and a guide sleeve fitted slidably on the cutter spindle for sheathing the cutter, when the cutter spindle is inserted into or retracted out of the one of the bores, to protect the inner walls of the workpiece from damage, and for exposing the edge of the cutter to the outside when in the deburring operation. The cutter is directed along a curve of the inner edges of the bore of the workpiece by a cam on the frame engaged by a follower on the cutter spindle. A three-dimensional curve of the inner edges can be deburred precisely.

1 Claim, 11 Drawing Figures

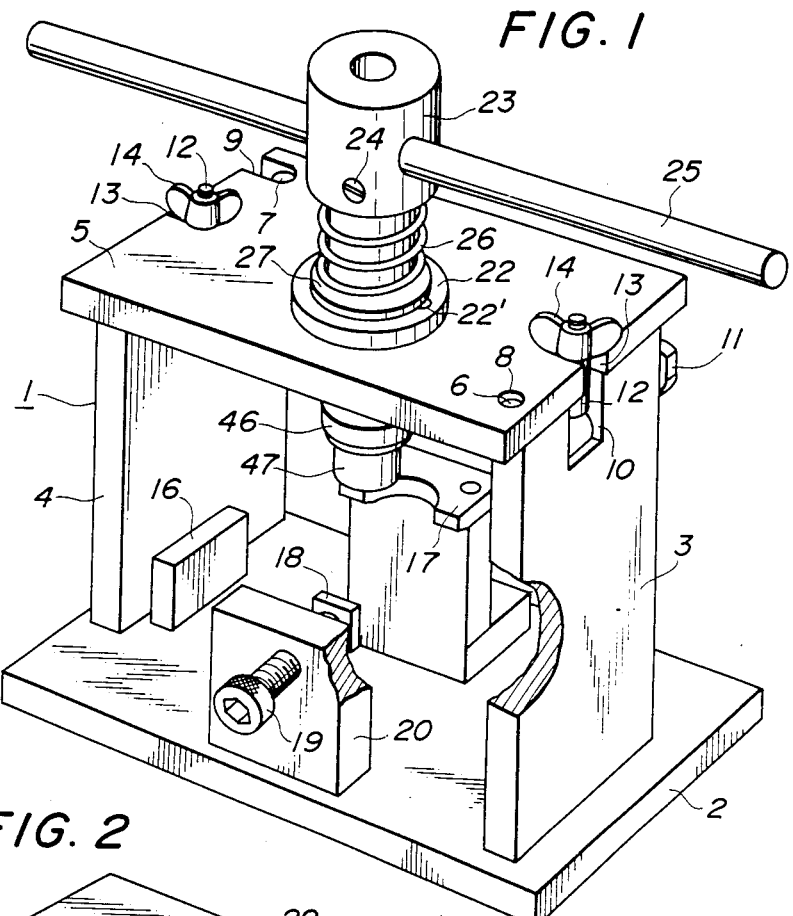
FIG. 1
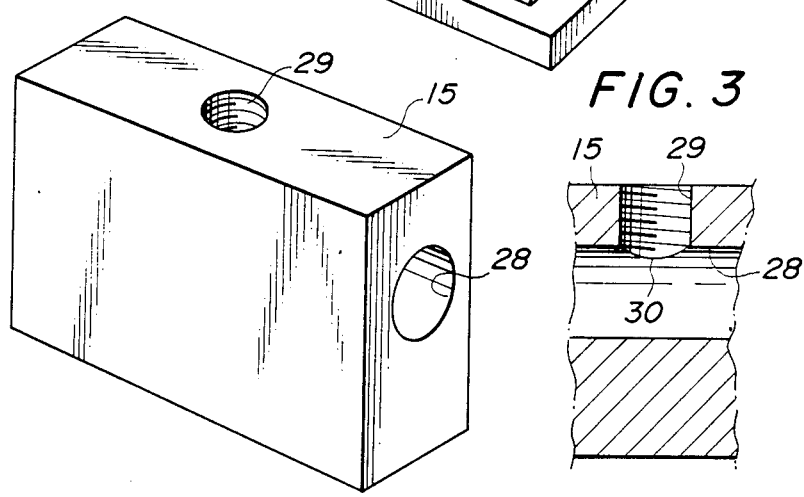
FIG. 2
FIG. 3

DEBURRING APPARATUS

BACKGROUND OF THE INVENTION

The present invention relates to a deburring apparatus and, more particularly, to an apparatus for efficiently cutting off the burrs which are formed at the intersecting inner edges of two or more intersecting bores in a workpiece.

In the prior art, the deburring operation of the inner edges formed at the intersections of the two or more bores is so difficult that it cannot be sufficiently conducted, because the burrs appear three-dimensionally in a limited space of the workpiece. Further, when the cutter is inserted into or retracted out of one of the bores of the workpiece, it may hit and damage the inner wall of that bore. In addition, it is very troublesome to attach and detach the cutter. Thus, there are few deburring apparatus which can suffice the deburring operation.

SUMMARY OF THE INVENTION

It is, therefore, an object of the present invention to provide a deburring apparatus which is intended to eliminate the aforementioned defects concomitant with the deburring apparatus of the prior art.

According to a major feature of the present invention, there is provided a deburring apparatus for removing the burrs which are formed at the intersecting inner edges of at least two intersecting bores of a workpiece, comprising: a frame having means for holding said workpiece, a cutter spindle borne rotatably in said frame, a cutter hinged to the leading end portion of said cutter spindle and biased to swing outwardly of the side thereof for cutting off the burrs at the inner edges of the bores of said workpiece held by the holding means of said frame when said cutter spindle is inserted into one of said bores and rotated; and a guide sleeve fitted slidably on said cutter spindle for sheathing said cutter, when said cutter spindle is inserted into or retracted out of the one of said bores, and for exposing the edge of said cutter to the outside when in the deburring operation. A cam means is also provided for directing the cutter along a curve of the inner edges of the bores of said workpiece, consisting of a member fixed on the frame and having a cam face profiling the curve of the inner edges, and a follower fixed on said cutter spindle and urged to come into contact with said cam face during said deburring operation. The deburring apparatus of the present invention has an advantage that it can conduct the deburring operation reliably with a simple construction but without damaging the inner walls of the bores and can deburr the three-dimensional curve of the inner edges precisely.

BRIEF DESCRIPTION OF THE DRAWINGS

Other objects, features and advantages of the present invention will become apparent from the following description taken in connection with the embodiment thereof with reference to the accompanying drawings, in which;

FIG. 1 is a partially cut-away perspective view showing the appearance of a deburring apparatus according to one embodiment of the present invention;

FIGS. 2 and 3 are a perspective view of a workpiece and a longitudinal sectional view showing a portion of the same, respectively;

DESCRIPTION OF THE PREFERRED EMBODIMENT

Figure 4:
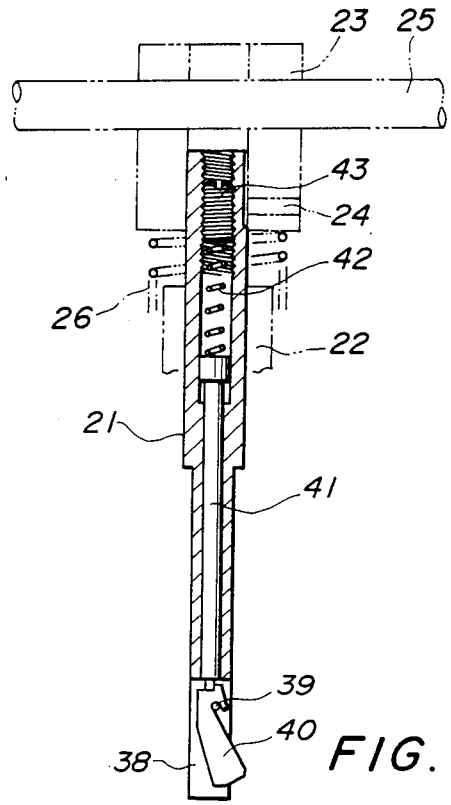
FIG. 4 is a longitudinal sectional view showing a cutter spindle.

The present invention will be described below in detail in connection with the embodiment thereof with reference to the accompanying drawings.

As shown in FIG. 1., a frame 1 has its side plates 3 and 4 fixed on a base 2 by means of screws or the like and its top plate 5 placed removably on the side plates 3 and 4. The top plate 5 is formed with an engagement hole 8 and an engagement flute 9 which are made engageable with pins 6 and 7 anchored at the tops of the side plates 3 and 4, respectively. Bolts 12 are so hinged by means of pin bolts 11 as to swing in grooves 10 which are opened in the respective upper ends of the side plates 3 and 4. The bolts 12 are inserted sideways into engagement flutes 13, which are formed in the sides of the top plate 5, and are fixed removably in position on the side plates 3 and 4 by fastening butterfly nuts 14 downward. There are mounted on the aforementioned base 2 jigs 16 and 17 which are used to fix a workpiece 15 in position in accordance with the size thereof and the position of bores. In a position to face the jig 17, moreover, there is screwed such a holding bolt 19 into a bracket 20 fixed on the base 2 as is used for thrusting and fixing the workpiece 15 through a holding plate 18.

Figure 5:
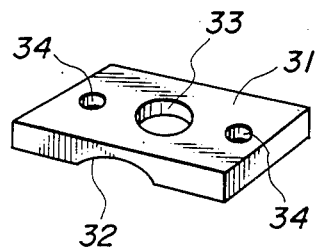
FIGS. 5 and 6 are perspective views showing a template and a pin bracket, respectively.

A cutter spindle 21 is borne rotatably in a cylindrical bearing 22, which is fastened to the aforementioned top plate 5 by means of a screw 22', and a head member 23 is fitted on the upper end of the cutter spindle 21 and fastened by means of a screw 24. The cutter spindle 21 per se is turned by means of a handle 25 which is attached to the head member 23. Between the bearing 22 and the head member 23, there is mounted a spring 26 for biasing the cutter spindle 21 upward, as shown. A washer 27 is sandwiched between the lower face of the spring 26 and the flange face of the bearing 22. Moreover, the aforementioned top plate 5 is equipped on its lower face with a template 31 so that the cutter spindle 21 may move up and down, when it is rotated, along a three-dimensional curve which is formed at the intersecting edge 30 of bores 28 and 29 of the workpiece 15. As shown in the drawings, the bore 29 is threaded. The template 31 is formed, as better seen from FIG. 5., in its lower face with a cam face 32 profiling the curve of the intersecting edge 30, at its center with a hole 33 for receiving the cutter spindle 21, and at its side edges with mounting holes 34 through which it is attached to the top plate 5.

Figure 6:
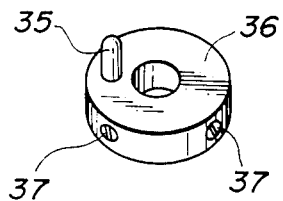

There is fixed to the cutter spindle 21 by means of a fixing screw 37 a pin bracket 36 which is equipped with a pin 35 for profiling the cam face 32 of the template 31 (as shown in FIG. 6). The pin bracket 36 may be formed integrally with the cutter spindle 21. The pin 35 is urged to come into abutment with the cam face 32 by the elastic action of the spring 26 so that it slides on the cam face 32, as the cutter spindle 21 rotates, to move the cutter spindle 21 up and down.

This cutter spindle 21 is formed into a pipe shape, as better seen from FIG. 4, and is formed at its leading end with a slit 38 in which a pin 39 is anchored. A cutter 40 is hinged swingably to the pin 39 of the slit 38 so that it has its side edge pushed by urging a plunger 41, which is fitted slidably in the bore of the cutter spindle 21, downward of the drawing to swing outwardly of the side of the cutter spindle 21. The strength of the aforementioned spring 42 can be adjusted by turning an adjust screw 43 which is screwed downward into the cutter spindle 21, and the cutter 40 is formed with a retaining edge 44 and a pressure face 45 at its upper end such that the retaining edge 44 is swung into abutment against the side surface of the leading end of the plunger 41, when the flat portion of the pressure face 45 is thrusted by the leading end of the plunger 41, until the cutter 40 has its edge swung out of the cutter spindle 21 (as better seen from FIG. 7).

Figure 7:
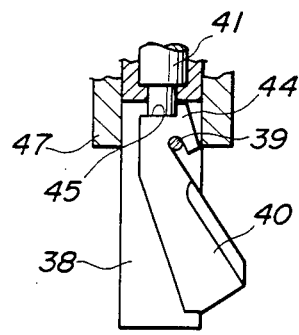
FIGS. 7 and 8 are enlarged sectional views showing the states of the leading end portion of the cutter spindle.
Figure 8:
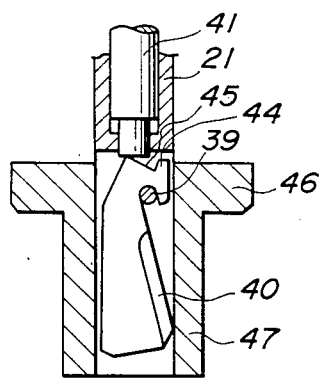
Figure 9:
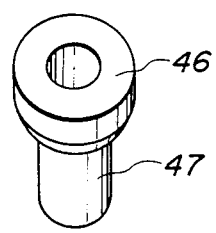
FIGS. 9 and 10 are perspective views showing a guide sleeve and a collar, respectively.
Figure 10:
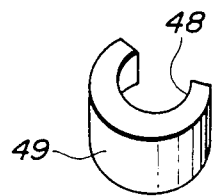
Figure 11:
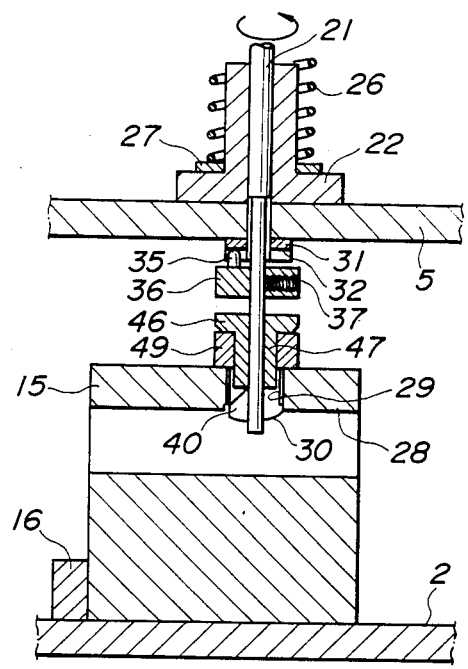
FIG. 11 is a longitudinal sectional view showing the state of use of the deburring apparatus of FIG. 1.

On the outer circumference of the leading end portion of the cutter spindle 21, there is slidably fitted a guide sleeve 47 which is flanged, as at 46, for sheathing the cutter 40 to control the protrusion of the same (as better seen from FIGS. 8 and 9). The guide sleeve 47 has its inner wall face pushing the leading end of the cutter 40, while it is in its lower position, to force the cutter 40 retracting into the slit 38 of the cutter spindle 21 against the action of aforementioned spring 42 (as shown in FIG. 8), but releases the cutter 40, while it is in its elevated upper position, to allow the cutter 40 to swing outward (as shown in FIG. 7). In order to hold the guide sleeve 47 in its upper position, moreover, a collar 49 having its one side opened, as at 48, is sandwiched between the workpiece 15 and the flange 46 of the guide sleeve 47, as shown in FIGS. 10 and 11. Instead of this construction, however, a suitable lever mechanism or the like may be interposed between the guide sleeve 47 and the cutter spindle 21 to hold the former in the upper and lower positions respectively.

Thus, when the deburring apparatus is to be used, the top plate 5 is placed on the side plates 3 and 4 by using the pins 6 and 7 as guide means in the states in which the workpiece 15 is fixed in position on the base 2 and in which the cutter 40 is sheathed by the guide sleeve 47 and forced into the slit 38 of the cutter spindle 21. Then, the cutter 40 is inserted, while being sheathed by the guide sleeve 47, into the bore 29, and the top plate 5 is therefore fastened to the side plates 3 and 4 by means of the bolts 12 and the butterfly nuts 14. In this meanwhile, the bore 29 is freed from being damaged by the edge of the cutter 40 because it is protected by the guide sleeve 47.

Next, if nothing but the guide sleeve 47 is moved upward, the cutter 40 has its edge exposed to the outside and is urged by the spring 42 into abutment against the inner (intersecting) edge 30 of the bore 29. Then, the collar 49 is inserted into the clearance between the flange 46 of the guide sleeve 47 and the outer edge of the bore 29, and the guide sleeve 47 per se is held in its upper position. If the cutter spindle 21 is rotated by the handle 25, it is moved up and down in accordance with the engagement of the pin 35 with the cam face 32 so that the inner edge 30 of the bore 29 can be precisely deburred by the edge of the cutter 40.

After this deburring operation, in accordance with the reversed procedures, the collar 49 is first removed, and the guide sleeve 47 is moved down to sheath the cutter 40. Then, if the top plate 5 is loosened and pulled up, the cutter 40 can be retracted from the deburred bore 29, while being sheathed by the guide sleeve 47, so that the bore 29 can be freed from any damage. The burrs of the inner edges of the bores can be consecutively cut off by repeating the aforementioned operations with the workpieces renewed. Incidentally, the top plate 5 may be placed in a vertically movable manner by means of guide pins and pop-up springs, for example, without being detached from the side plates 3 and 4 and so on.

As has been described hereinbefore, the deburring apparatus according to the present invention can precisely cut off the burrs at the inner edges of the bores of the workpiece even with the relatively simple construction and can protect but not damage the inner walls of the bores with the use of the guide sleeve 47. Thus, the deburring apparatus of the present invention can find its most effective application in case the bores are threaded.

What is claimed is:

1. A deburring apparatus for removing burrs which are formed at the intersecting inner edges of at least two intersecting bores of a workpiece, comprising: a frame having means for holding said workpiece; a cutter spindle borne rotatably in said frame in axial alignment with one of said bores; a cutter hinged to a leading end portion of said cutter spindle and biased to swing outwardly of the peripheral side thereof for cutting off the burrs at said intersecting inner edges of said intersecting bores of said workpiece held by said holding means of said frame when said cutter spindle is inserted into said one of said bores and is rotated; a guide sleeve fitted slidably on said cutter spindle for sheathing said cutter while said cutter spindle is being inserted into or retracted out of said one of said bores, and for exposing the edge of said cutter to the outside when in the deburring operation; and cam means for directing said cutter along a curve defined by said intersecting inner edges of said bores of said workpiece, said cam means comprising a member fixed on said frame and having a cam face profiling said curve defined by said inner edges, and a follower fixed on said cutter spindle and urged to come into contact with said cam face during said deburring operation.

* * * * *